(12) United States Patent
Deshpande et al.

(10) Patent No.: US 10,626,317 B2
(45) Date of Patent: Apr. 21, 2020

(54) ASPHALTENE DISPERSANT AND METHODS OF USE THEREOF

(71) Applicant: M-I L.L.C., Houston, TX (US)

(72) Inventors: Pradyumna Avinash Deshpande, Houston, TX (US); Chandrashekhar Yeshwant Khandekar, Katy, TX (US)

(73) Assignee: M-I L.L.C., Houston, TX (US)

( * ) Notice: Subject to any disclaimer, the term of this patent is extended or adjusted under 35 U.S.C. 154(b) by 299 days.

(21) Appl. No.: 15/176,768

(22) Filed: Jun. 8, 2016

(65) Prior Publication Data

US 2016/0355629 A1 Dec. 8, 2016

Related U.S. Application Data

(60) Provisional application No. 62/172,590, filed on Jun. 8, 2015.

(51) Int. Cl.
| | |
|---|---|
| *C09K 8/524* | (2006.01) |
| *C08F 279/02* | (2006.01) |
| *C09K 8/035* | (2006.01) |
| *C08F 8/32* | (2006.01) |

(52) U.S. Cl.
CPC ............... *C09K 8/524* (2013.01); *C08F 8/32* (2013.01); *C08F 279/02* (2013.01); *C09K 8/035* (2013.01)

(58) Field of Classification Search
CPC ....................................................... C10G 3/00
See application file for complete search history.

(56) References Cited

U.S. PATENT DOCUMENTS

| | | | | |
|---|---|---|---|---|
| 3,234,155 | A * | 2/1966 | Dearborn | C07D 233/16 524/106 |
| 3,546,184 | A * | 12/1970 | Dittmann | C08C 19/28 525/245 |
| 5,214,224 | A | 5/1993 | Comer et al. | |
| 6,313,367 | B1 * | 11/2001 | Breen | B01F 17/0021 208/22 |
| 7,682,460 | B2 | 3/2010 | Ferrara | |

(Continued)

FOREIGN PATENT DOCUMENTS

| | | |
|---|---|---|
| EP | 0403958 B1 | 1/1997 |
| EP | 1752516 A1 | 2/2007 |

(Continued)

OTHER PUBLICATIONS

International Search Report and Written Opinion for the equivalent International patent application PCT/US2016/036304 dated Aug. 24, 2016.

(Continued)

*Primary Examiner* — William D Hutton, Jr.
*Assistant Examiner* — Avi T Skaist

(57) ABSTRACT

A wellbore fluid treatment may include a compound formed from reaction between cyclic anhydride pendant groups on a polymer backbone with at least one amino acid, neutralized with a nitrogen containing compound. Methods may include injecting such a compound into a hydrogen production stream. Other methods may include reacting polybutadiene grafted maleic anhydride with at least one amino acid to produce an intermediate; and reacting the intermediate with an amide, amine, or imidazoline having at least a C4-C24 group to produce a compound.

11 Claims, 5 Drawing Sheets

(56) References Cited

U.S. PATENT DOCUMENTS

| | | |
|---|---|---|
| 2003/0092829 A1 | 5/2003 | Klauck et al. |
| 2005/0139238 A1 | 6/2005 | Ferrara |
| 2007/0027046 A1 | 2/2007 | Friend et al. |
| 2008/0289249 A1 | 11/2008 | Hou et al. |
| 2009/0282731 A1 | 11/2009 | Malfer et al. |
| 2011/0010985 A1 | 1/2011 | Hou et al. |
| 2013/0186629 A1 | 7/2013 | Leonard et al. |
| 2013/0270157 A1 | 10/2013 | Ferrara |
| 2013/0303415 A1 | 11/2013 | Jones et al. |
| 2014/0190692 A1 | 7/2014 | Hibbeler et al. |
| 2015/0112060 A1 | 4/2015 | Hernandez Altamirano et al. |
| 2015/0128484 A1 | 5/2015 | Nordvik et al. |

FOREIGN PATENT DOCUMENTS

| | | |
|---|---|---|
| EP | 1565277 B1 | 3/2016 |
| WO | 2003/103863 A1 | 12/2003 |
| WO | 2013/156228 A1 | 10/2013 |

OTHER PUBLICATIONS

International Preliminary Report on Patentability for the equivalent International patent application PCT/US2016/036304 dated Dec. 21, 2017.

* cited by examiner

ASPHALTENE DISPERSANT AND METHODS OF USE THEREOF

CROSS-REFERENCE TO RELATED APPLICATIONS

This application claims the filing benefit of U.S. Provisional Patent Application Ser. No. 62/172,590 filed on Jun. 8, 2015, which is incorporated by reference herein in its entirety.

BACKGROUND

Asphaltenes are complex heterocyclic molecules that are present in hydrocarbon fluids. Under reservoir conditions asphaltenes are stabilized by resins. During the production asphaltene precipitation can occur due to number of factors such as changes to pressure, temperature, chemical composition of the crude oil and during stimulation operations. Precipitated asphaltene particles may flocculate and deposit on to pipeline surfaces or equipments to cause plugging problems. Precipitated asphaltene particles can also increase hydrocarbon viscosity which may lead to separation problems. In addition precipitated asphaltene particles can cause pore throat plugging which may cause blockages and lead to lower production rates.

In addition to mechanical methods available to mitigate asphaltene related challenges, aromatic solvents can be added to dissolve asphaltenes. However, solubility and of asphaltene in aromatic solvents is very low and improper cleaning can lead to possible slow re-precipitations. To overcome these problems an asphaltene inhibitor or a dispersant is typically added to the production system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid treatment that includes a compound formed from reaction between cyclic anhydride pendant groups on a polymer backbone with at least one amino acid, neutralized with a nitrogen containing compound.

In another aspect, embodiments disclosed herein relate to a method that includes introducing to a hydrocarbon production stream, a compound formed from reaction between cyclic anhydride pendant groups on a polymer backbone with at least one amino acid, neutralized with a nitrogen containing compound In yet another aspect, embodiments disclosed herein relate to a method that includes reacting polybutadiene grafted maleic anhydride with at least one amino acid to produce an intermediate; and reacting the intermediate with an amide, amine, or imidazoline having at least a C4-C24 group to produce a compound.

Other aspects and advantages of the claimed subject matter will be apparent from the following description and the appended claims.

DETAILED DESCRIPTION

Figure 1:
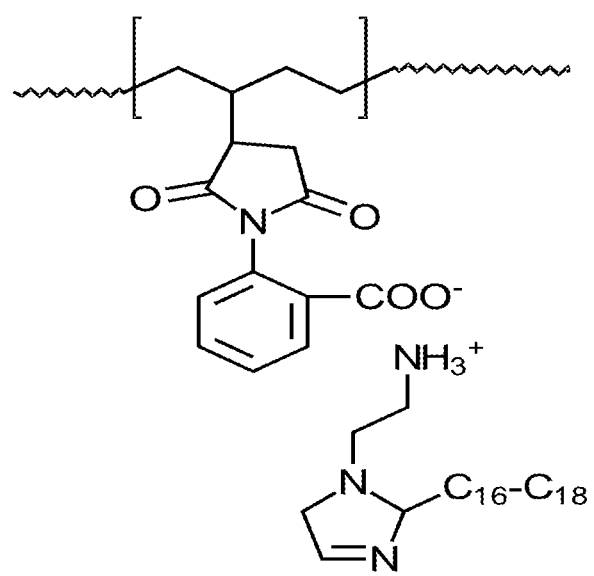
FIG. 1 illustrates an asphaltene dispersant based on polybutadiene grafted maleic anhydride derivative, in accordance with the disclosed embodiments.

Embodiments disclosed herein are directed to methods and compositions for inhibiting or dispersing the deposition of asphaltenes from hydrocarbon fluids within wellbores. In one or more embodiments, methods and compositions in accordance with the present disclosure are directed to inhibiting or dispersing asphaltene deposition for topside and downhole oilfield applications. Treatment fluid compositions of the present disclosure may be used in downhole and surface applications including dispersion of existing residues on wellbore equipment and wellbore surfaces, in addition to inhibition of asphaltene precipitation during production and transportation of various hydrocarbon fluids.

During the production of the well, asphaltenes may precipitate out of the oil, creating aggregates that may entrain solids, which may initiate the formation of sludges and other insoluble residues. Asphaltene deposits may accumulate on the surfaces of completions equipment and reservoir pore throats, which can lead to production impairment and other operational problems including but not limited to, plugging of equipment, pressure loss, increased utility costs, lost production due to downtime, and downgraded products from insufficient feeds.

Asphaltenes are organic materials containing aromatic and naphthenic ring compounds that may come in the form of polyaromatic or polycyclic structures, and which may include a number of alkyl chains and heteroatoms such as nitrogen, sulfur and oxygen. Asphaltenes are often described as the "hydrocarbon fraction," which contains a wide variety of heavy and polar molecules from crude oils that are soluble in aromatic solvents, but insoluble in normal alkane-based solvents such as pentane or heptane.

Asphaltenes exist as a colloidal suspension stabilized by aromatic resins in crude oil. The stability of asphaltic dispersions may depend in part on the ratio of resin to asphaltene molecules, which may be used to estimate potential damage created by asphaltenes. During production and transport of hydrocarbon fluids, asphaltenes may precipitate as a result of pressure drop, composition changes, pressure depletion above the saturation pressure, temperature changes, shear from turbulent flow, intermixing of incompatible fluids or materials that break the stability of the asphaltic dispersion, and other parameters such as pH, solution carbon dioxide, water cut, electro-kinetic effects.

Asphaltene inhibitor and treatment fluid compositions in accordance with the present disclosure may be used as additives that are provided to hydrocarbon mixtures to disperse asphaltene aggregates and/or prevent flocculation of heavy hydrocarbons. Treatment fluids in accordance with the present disclosure may be suitable for use in downhole environments, at the surface, and in pipelines used to transport hydrocarbons. In some embodiments, asphaltene inhibitors may be placed into a hydrocarbon production stream at any point, including within the wellbore, at the surface of the well, and during transport of the hydrocarbon stream through pipelines or storage tanks.

Asphaltene inhibitor compositions of the present disclosure may be mixed with hydrocarbon fluids either by batch treatment or by continuous injection. In some embodiments, asphaltene inhibitors may be used as a wellbore fluid additive, and in other treatment fluids such as squeeze treatments, or fluid loss control pills. Further, compositions in accordance with the present disclosure may inhibitor asphaltene agglomeration under HPHT conditions. In some embodiments, treatment compositions may contain an asphaltene inhibitor combined with one or more aromatic solvents.

In one aspect, embodiments disclosed herein relate to polymeric asphaltene dispersants formed from reaction between cyclic anhydride pendant groups on a polymer backbone with at least one amino acid, neutralized with a nitrogen containing compound.

The pendant groups may be formed by grafting a cyclic anhydride, such as maleic anhydride, onto a polymer backbone, such as polybutadiene. Grafting may allow for control of the pendant groups throughout the polymer backbone, as compared, for example to polyisobutylene succinic acid (PIBSA) where the polymer includes only one terminal anhydride functionality per molecular. In one or more embodiments, the grafted cyclic anhydride may be grafted at an amount ranging from 1 to 20 wt % of the polymer onto which it is being grafted. In more particular embodiments, the cyclic anhydride may be granted at an amount having a lower limit of any of 1, 2, or 3 wt % and an upper limit of any of 6, 8, 10, 15, and 20 wt %, where any lower limit can be used with any upper limit.

The pendant cyclic anhydride groups may be reacted with an amino acid to form an intermediate compound which is subsequently neutralized. Amino acids may include, but are not limited to non-proteinogenic amino acids such as anthranilic acid, aminocaproic acid, or γ-aminobutyric acid, as well as the twenty three proteinogenic amino acids, such as lysine, etc.

In one or more embodiments, the neutralizer may be a nitrogen containing compound such as an amide, amine, imidazoline to yield the inhibitor/dispersant of the present disclosure. Further, in addition to a nitrogen functionality, the neutralizer may also include an alkyl chain having at least 4, 6, 8, or 12 carbon atoms up to, for example 18, 20, 22, or 24 carbon atoms, and may be linear, branched, saturated or unsaturated. Such neutralizer may neutralize the acid of the amino acid and also may interact with the asphaltene to assist in the dispersant/inhibition effect. An example of the neutralized (and final) product is shown in FIG. 1. However, given that variations on the reactants are envisioned, as described above, FIG. 1 is only representative of the structure of the compounds of the present disclosure. Other potential structural formulas include, but are not limited to the final products presented in FIGS. 2-4.

Polymeric asphaltene inhibitors in accordance with the present disclosure may range in molecular weight (Mn) from 900 Da to 100 kDa in some embodiments, and from 2 kDa to 25 kDa in particular embodiments.

Asphaltene inhibitors in accordance with the present disclosure may be added to a wellbore fluid formulation at a concentration that may range from 5 ppm to 1,500 ppm of the wellbore fluid in some embodiments, and from 10 ppm to 1,000 ppm in particular embodiments.

In one or more embodiments, asphaltene inhibitors may be used in conjunction with one or more aromatic solvents that may increase the dispersion and/or inhibitory effects of the treatment. Aromatic solvents in accordance with the present disclosure may be combined with an asphaltene inhibitor prior to injection downhole or subsequent to the injection of the asphaltene inhibitor or other wellbore fluid. Suitable aromatic solvents of the composition of this invention include benzenes, alkyl benzenes such as toluene, xylene, trimethyl benzene, and the like. While a number of solvents are disclosed, it is also envisioned that other solvents may be selected that are miscible with petroleum fluids such as crude oil, condensates, diesel, and the like. In one or more embodiments, wellbore treatment compositions may contain one or more aromatic solvents at a percent by volume (v %) that ranges from 1 v % to 90 v %.

EXAMPLES

Sample 1

Figure 2:
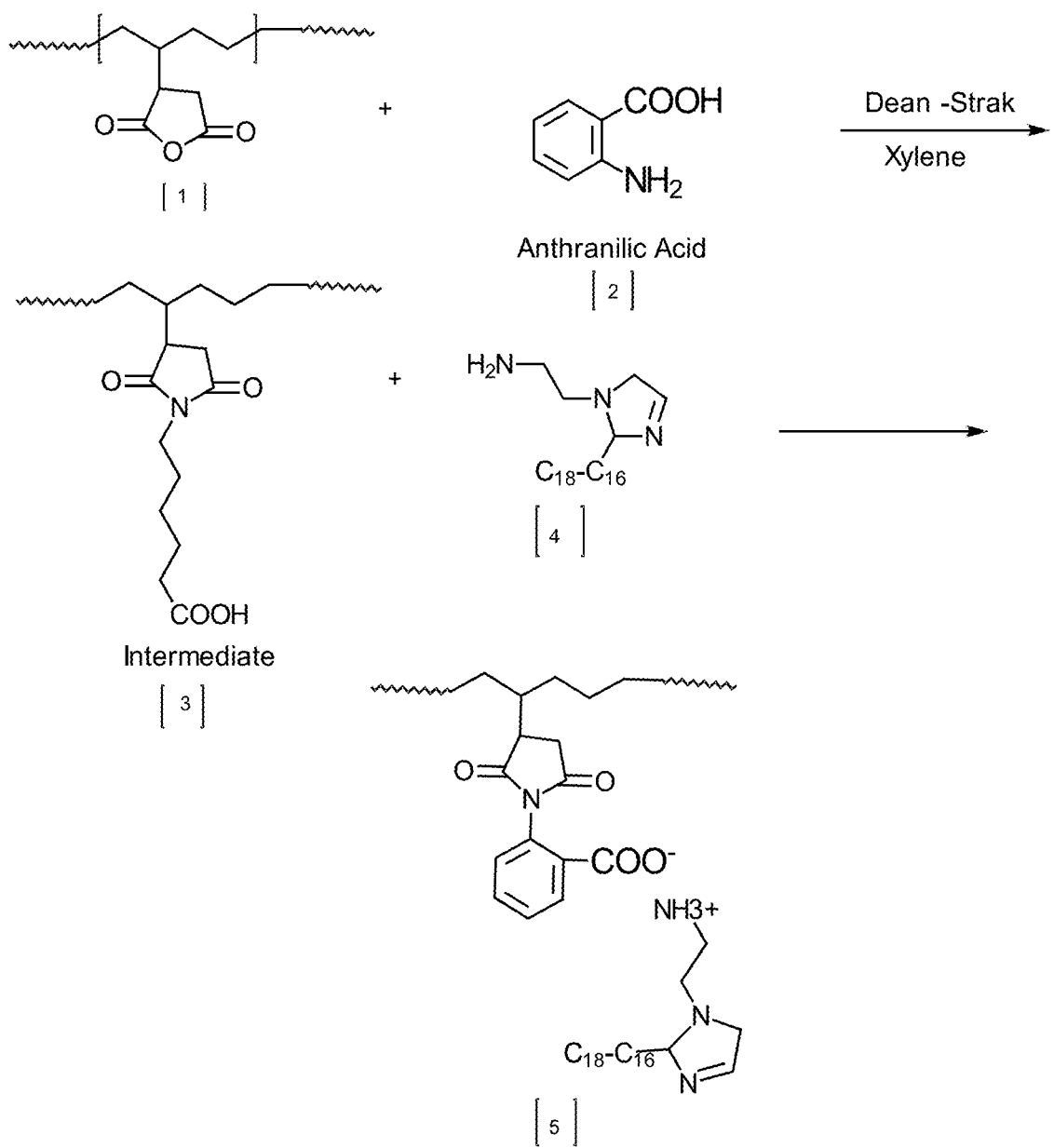
FIGS. 2-4 illustrate synthesis of asphaltene dispersants, in accordance with the disclosed embodiments.

As illustrated in FIG. 2, an asphaltene dispersant was prepared by charging 50 g polybutadiene grafted maleic anhydride [1] with number average molecular weight (Mn) of 5500 to a 500 ml reaction flask containing 35.89 g xylene, equipped with overhead stirrer, heating mantle, thermocouple, dean stark trap and water cooler condenser. 0.13 g PTSA catalyst was added. The material was then mixed for 30 min and 3.42 g of Anthranilic acid [2] added. The temperature increased to 145° C. until reflux started. The reaction continued until 0.46 g quantity of water was removed. The reaction then stirred for 30 min. Heating was ceased and reaction mixture [3] cooled. Then 98.31 of xylene was added and mixed well for 30 min, at which time 8.87 g of imidazoline [4] was added drop wise while stirring the reaction mixture. Reaction mixture was then stirred for 1 hr. The final product [5] (196.1 g) was a dark amber color liquid.

Sample 2

Figure 3:
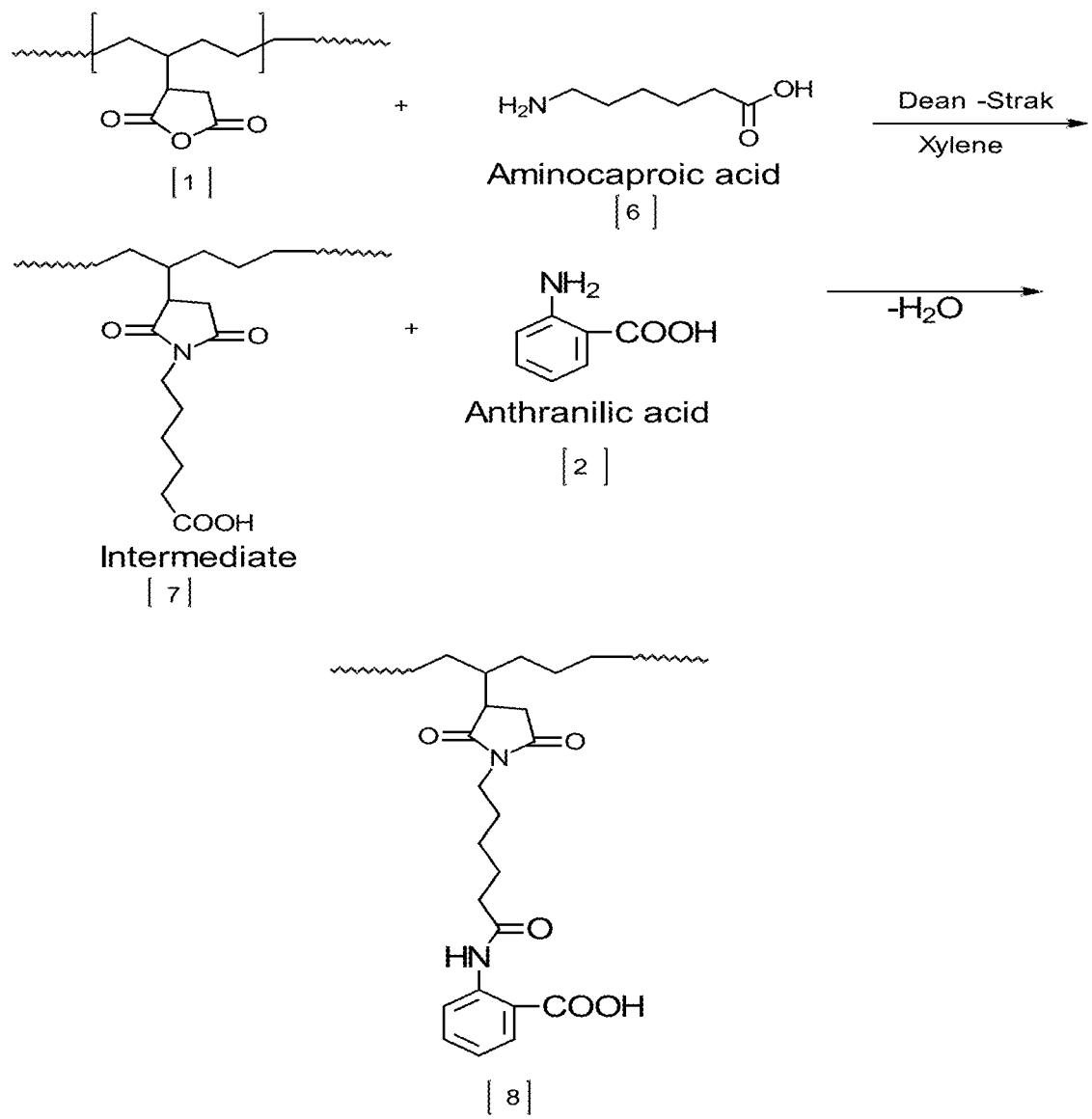

As illustrated in FIG. 3, an asphaltene dispersant was prepared by charging 50 g polybutadiene grafted maleic anhydride [1] with number average molecular weight (Mn) of 5500 to a 500 ml reaction flask containing 56.89 g xylene, equipped with overhead stirrer, heating mantle, thermocouple, dean stark trap and water cooler condenser. 0.13 g PTSA catalyst was added. The material was then mixed for 30 min and 3.28 g of 6-aminocaproic acid [6] added. The temperature increased to 145° C. until reflux started. The reaction continued until 0.46 g quantity of water was removed. The intermediate product [7] was then stirred for 30 min. Heating stopped and reaction mixture cooled down to 70° C. and 3.48 g of Anthranilic acid [2] was added and mixed well for 30 min. The temperature of the reaction mixture was then raised sufficiently to induce reflux. The reaction continued until another 0.40 ml water was removed. Reaction continued to stir for 1 hr. Heating was then stopped and product allowed to cool to room temperature. The final product [8] (113.78 g) was a dark amber color liquid.

Sample 3

Figure 4:
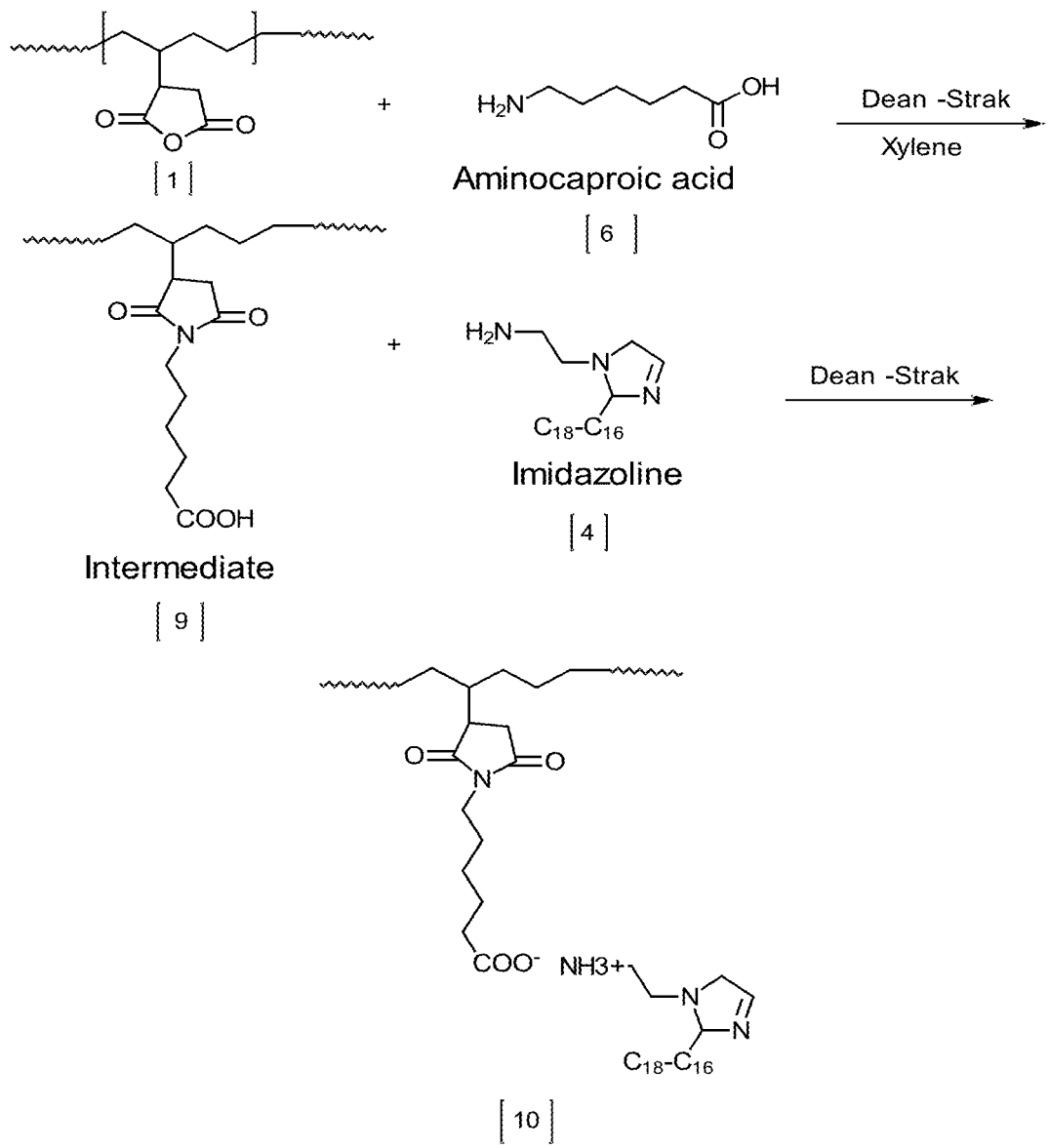

As illustrated in FIG. 4, an asphaltene dispersant was prepared by charging 50 g polybutadiene grafted maleic anhydride [1] with number average molecular weight (Mn) of 5500 to a 500 ml reaction flask containing 54.35 g xylene, equipped with overhead stirrer, heating mantle, thermocouple, dean stark trap and water cooler condenser. 0.13 g PTSA catalyst was added. The material was then mixed for 30 min and 3.28 g of aminocaproic acid [6] added. The temperature was then increased to 145° C. until reflux started. The reaction continued until 0.46 g quantity of water was removed. The reaction mixture intermediate [9] then stirred for 30 min. 8.87 g of imidazoline [4] was then added drop wise while stirring of mixture continued. Reaction was stirred for 1 hr. The final product [10] (115.67 g) was a dark amber color liquid.

Each of the modified polybutadiene grafted maleic anhydride derivatives (Samples 1-3) was then screened for effectiveness as an asphaltene dispersant per the following methods:

1. ADT Evaluation

Asphaltene Dispersant Test (ADT) is widely used to screen and evaluate asphaltene dispersants in the oil and gas industry. The procedure is used for comparing the asphaltene content of crude oils and evaluating the ability of asphaltene dispersant to disperse asphaltenes within such oils.

In the ADT method, n-alkane (C5, C7 or C9) is employed as the solvent. N-alkanes are non-polar in nature and promote the precipitation and agglomeration of polar asphaltene molecules. In a typical ADT method, crude oil is mixed with toluene at a ratio of 1:1 for 2 hours. A blank crude oil concentration is determined by adding different concentrations of 1:1 diluted solution as described above in a 10 ml graduated centrifuge tube containing 10 ml of n-alkane. The tubes were allowed to stand for 2 hours. A crude oil concentration was chosen which showed 4-10% asphaltene precipitation.

Figure 5:
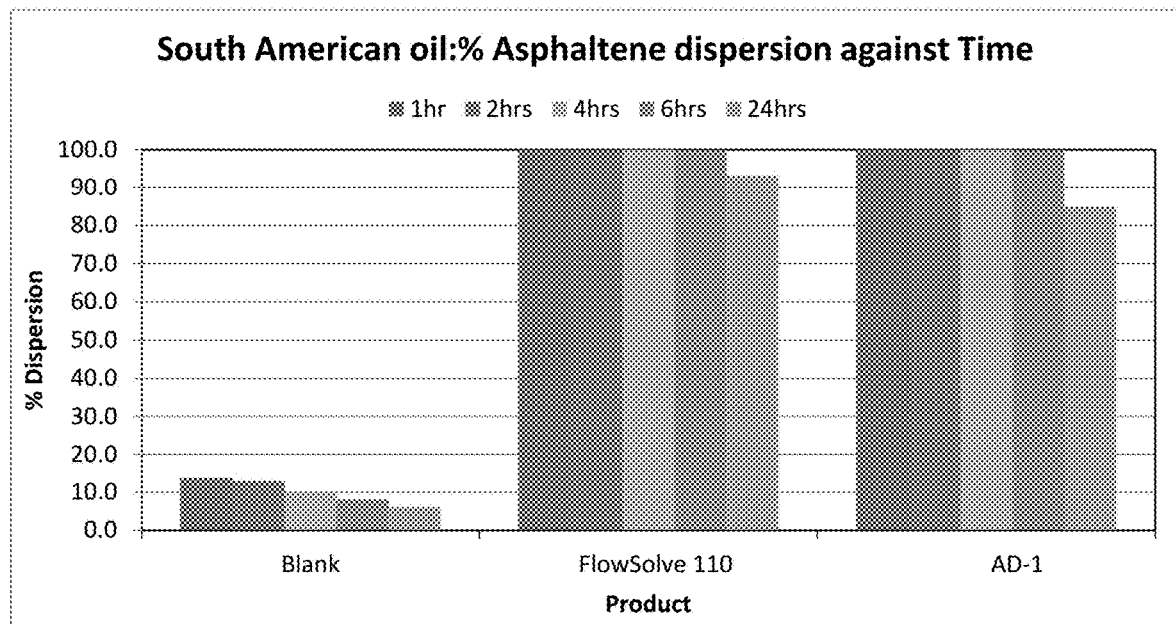
FIG. 5 illustrates the percentage asphaltene precipitation for a blank and relative percentages of asphaltene dipsersancy for tested dispersants, in accordance with the disclosed embodiments.

In other tubes, a known concentration of crude oil containing an n-alkane and predetermined dose rate of above synthesized asphaltene dispersant based on Sample 1 were added and sufficiently agitated. The products were then compared with a benchmark asphaltene dispersant, Flowsolve 110, at the same dose rate. Generally, the better the dispersant is, the more of the asphaltene will be dispersed in the treated n-alkane and less precipitation will be observed with various time intervals. Both the candidate tubes and the blank were allowed to stand for 2-24 hours. The percentage asphaltene precipitation for the blank and relative percentages of asphaltene dipsersancy were calculated for both Sample 1 and the benchmark commercial available Flowsolve 110 as shown in FIG. 5.

2. Turbiscan Test

This procedure details the use of a specific piece of optical scanning equipment (Formulaction's Turbiscan™ MA2000) for the evaluation of the static performance of asphaltene dispersants in crude oil by exploiting settling-over-time phenomenon of asphaltenes intentionally driven from solution. Following dilution and mixing with toluene and a candidate dispersant, the method calls for blending with n-alkane to force the asphaltenes out of solution. By the recording a number of scans over a period of time (from 15 minutes to 24 hours), it is possible to see a visual result of whether the asphaltenes are settling to the bottom of the tube over time by observing an increase in light transmission in the Turbiscan plots over the length of the tube. By observing the percentage of light transmission for an individual sample it is possible to obtain a separability number for dilutions of 1:3, 1:6, and 1:9 (oil:toluene).

In an experiment on Mexican crude oil diluted with 1:3, 1:6 and 1:9 dilutions in toluene, each tube was scanned for 24 hours at 15 minute intervals. A separability number for each of the three dilutions was calculated. The highest separability number given for dilution that was chosen for further dispercency experiments as it represents the "worst-case" for phase separation.

The calculated dose rate of the asphaltene dispersant from Sample 1 was added to the selected crude:toluene dilution in a test tube and scans were taken in intervals for 24 hours. The same procedures were carried for benchmark Flowsolve 110 at the same dose rate.

Figure 6:
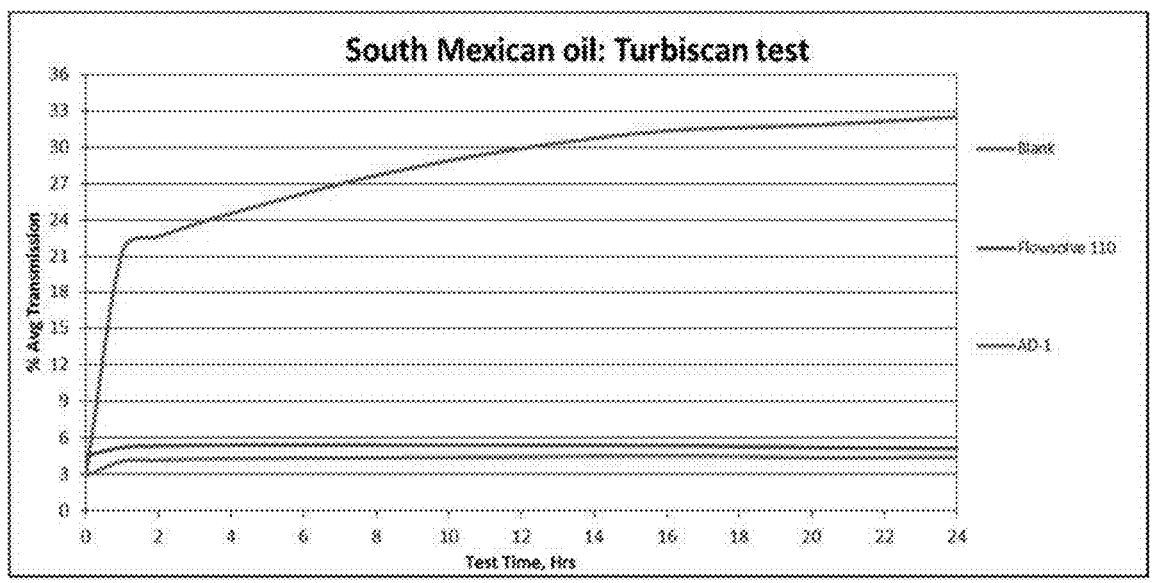
FIG. 6 illustrates the percentage transmission of the blank compared to asphaltene dispersant potted against time, in accordance with disclosed embodiments.

The percentage transmission of the blank compared to asphaltene dispersant based on Sample 1 and benchmark Flowslove 110 was potted against time as illustrated in FIG. 6. FIG. 6 clearly shows the dispersant in Sample 1 had lowest percentage transmission over 24 hours.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:
   grafting a cyclic anhydride onto a polymer backbone to produce cyclic anhydride pendant groups on the polymer backbone;
   reacting the cyclic anhydride pendant groups on the polymer backbone with at least one amino acid to form an intermediate compound;
   reacting the intermediate compound with a neutralizer having an alkyl chain comprising at least 4 carbon atoms and no more than 24 carbon atoms to produce a polymeric asphaltene inhibitor;
   combining the polymeric asphaltene inhibitor with one or more aromatic solvents to produce a treatment fluid composition; and
   inhibiting or dispersing asphaltene deposition from hydrocarbon fluids by introducing the treatment fluid composition to a hydrocarbon production stream comprising the hydrocarbon fluids.

2. The method of claim 1, wherein the polymeric asphaltene inhibitor is added at a concentration ranging from 5 ppm to 1,500 ppm of the treatment fluid composition.

3. The method of claim 1, wherein cyclic anhydride is grafted onto the polymer backbone at an amount ranging from 1 to 20 wt %.

4. The method of claim 3, wherein the amount ranges from 1 to 6 wt %.

5. The method of claim 1, wherein the at least one amino acid comprises at least one selected from anthranilic acid and aminocaproic acid.

6. The method of claim 1, wherein the cyclic anhydride is maleic anhydride and the polymer backbone is polybutadiene.

7. The method of claim 1, wherein the alkyl chain of the neutralizer is linear, branched, saturated, or unsaturated and the neutralizer is a nitrogen-containing compound.

8. The method of claim 7, wherein the nitrogen-containing compound is an amide, an amine, or an imidazoline.

9. The method of claim 1, wherein the polymeric asphaltene inhibitor has a molecular weight (Mn) from 900 Da to 100 kDa.

10. The method of claim 9, wherein the molecular weight (Mn) of the polymeric asphaltene inhibitor is from 2 kDa to 25 kDa.

11. The method of claim 1, wherein the at least one aromatic solvent is miscible with one or more petroleum fluids and the treatment fluid composition contains the at least one aromatic solvent at a percent by volume (v %) ranging from 1 v % to 90 v %.

* * * * *